(12) United States Patent
Lever et al.

(10) Patent No.: US 11,835,444 B2
(45) Date of Patent: Dec. 5, 2023

(54) TRIBOMETER WITH REAL-TIME OBSERVATION OF INTERFACE PROCESSES

(71) Applicant: United States of America as Represented by The Secretary of The Army, Alexandria, VA (US)

(72) Inventors: James H Lever, Lebanon, NH (US); Susan Taylor, Lebanon, NH (US); Garrett R Hoch, Lebanon, NH (US); Emily Asenath-Smith, Norwich, VT (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 280 days.

(21) Appl. No.: 17/037,703

(22) Filed: Sep. 30, 2020

(65) Prior Publication Data

US 2022/0099558 A1   Mar. 31, 2022

(51) Int. Cl.
   *G01N 19/02* (2006.01)
   *G01N 19/08* (2006.01)
   *G01N 21/01* (2006.01)

(52) U.S. Cl.
   CPC ............. *G01N 19/02* (2013.01); *G01N 19/08* (2013.01); *G01N 21/01* (2013.01)

(58) Field of Classification Search
   CPC ......... G01N 19/02; G01N 19/08; G01N 21/01
   USPC .............................................................. 73/9
   See application file for complete search history.

(56) References Cited

U.S. PATENT DOCUMENTS

| | | | | | |
|---|---|---|---|---|---|
| 5,259,236 | A | * | 11/1993 | English | G01N 19/02 73/9 |
| 6,094,967 | A | * | 8/2000 | Cavdar | G01N 19/02 73/9 |
| 6,309,363 | B1 | * | 10/2001 | Chen | A61B 5/0057 600/587 |
| 6,981,400 | B1 | * | 1/2006 | Sowell | G01N 19/02 73/9 |

(Continued)

FOREIGN PATENT DOCUMENTS

| | | | | | |
|---|---|---|---|---|---|
| CN | 209927339 U | * | 1/2020 | | G01L 5/00 |
| JP | 2007012144 A | * | 1/2007 | | G01B 11/14 |

(Continued)

*Primary Examiner* — Herbert K Roberts
*Assistant Examiner* — Anthony W Megna Fuentes
(74) *Attorney, Agent, or Firm* — Brian C. Jones

(57) ABSTRACT

In one embodiment, a tribometer comprises: an infrared (IR) transparent and optically transparent disk coupled to a platform, the disk having an observation side disk surface on an observation side of the disk and a contact side disk surface on a contact side of the disk; a motor coupled to the disk to rotate the disk around a rotational axis of the disk; a pivot support coupled to the platform; a pivoting member connected to the pivot support to pivot along a pivot plane; a sample holder configured to hold a sample and be coupled with the pivoting member to place the sample in contact with the contact side disk surface of the disk; and an IR camera and an optical microscope disposed on the observation side of the disk to observe the sample in sliding contact with the contact side disk surface of the disk driven in rotation.

20 Claims, 13 Drawing Sheets

(56) References Cited

U.S. PATENT DOCUMENTS

| | | | | |
|---|---|---|---|---|
| 10,908,069 B2* | 2/2021 | Carpick | ................ | G01Q 60/26 |
| 2012/0240660 A1* | 9/2012 | Johnson | ........... | G01N 35/00693 |
| | | | | 73/9 |
| 2014/0116109 A1* | 5/2014 | Johnson | ........... | G01N 35/00693 |
| | | | | 73/9 |
| 2015/0057950 A1* | 2/2015 | Vassallo | ................ | G01N 19/02 |
| | | | | 702/33 |
| 2015/0068273 A1* | 3/2015 | Wolf | ...................... | G01N 11/14 |
| | | | | 73/9 |
| 2015/0082860 A1* | 3/2015 | Beau | .................. | G01M 13/005 |
| | | | | 73/9 |
| 2015/0276578 A1* | 10/2015 | Johnson | ................ | G01N 19/02 |
| | | | | 73/9 |
| 2017/0254740 A1* | 9/2017 | Carpick | ................ | G01Q 70/10 |

FOREIGN PATENT DOCUMENTS

| | | | | |
|---|---|---|---|---|
| JP | 2014092536 A | * | 5/2014 | ............. G01N 13/00 |
| WO | WO 2012006613 A2 | * | 1/2012 | ............... G01N 3/56 |

* cited by examiner

TRIBOMETER WITH REAL-TIME OBSERVATION OF INTERFACE PROCESSES

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to apparatus and methods of measuring and observing contact friction of materials.

Description of the Related Art

This section introduces aspects that may help facilitate a better understanding of the invention. Accordingly, the statements of this section are to be read in this light and are not to be understood as admissions about what is prior art or what is not prior art.

A tribometer is a device to study the processes of friction that occur between two contacting surfaces in relative motion. One example involves sliding contact. Tribometry is used to understand the degradation phenomena of internal contacts of a component by subjecting samples of materials used for the contacts to tests. It involves mounting test samples of the materials to be tested into the tribometer to be driven by a motor to subject them to impact, forces, and friction as would happen in real use of the contact. More specifically, the wear or degradation of the samples after the tests, identified by weighing, measuring, visual examination, and the like provides an indication of how the contacts will degrade in use.

SUMMARY

The present invention was developed to address the desire for a real-time observation of the physical processes that occur during sliding contact between materials. Research and development have led to a novel tribometer that enables real-time, high-resolution observations of the physical processes occurring at the sliding interface.

Embodiments of the present invention provide a sliding contact between a sample of a material of interest and an infrared (IR) transparent and optically transparent rotating slider, which may be a rotating disk or window. An IR camera and/or an optical microscope are used to observe, through the IR and optically transparent rotating slider, the friction processes that occur during the sliding contact, including, for example, the evolving micro-scale contact-temperature and contact-area distributions and shapes of any wear particles or melt generated by the sliding contact. A force sensor is used to perform concurrent contact-force measurements (normal force and friction force) at the sliding contact.

The present invention advances the science of tribometry. Key to the success of this apparatus is, among others, the ability to conduct concurrent, real-time, continuous, high-resolution observations of the contact interface during sliding-friction studies as well as concurrent contact-force measurements and contact imaging throughout a friction test.

The present invention differs from the traditional tribometry in that the tribometer makes use of an IR transparent and optically transparent rotating slider to allow the IR camera and optical microscope to observe, in real time (i.e., the actual time during which the tribometry process or event occurs) and continuously with high resolution, the contact interface during sliding-friction studies. The sample makes sliding contact with a contact side disk surface of the transparent disk and the IR camera and optical microscope are disposed on the opposite side, which is an observation side of the transparent disk, to observe, through the IR and optically transparent rotating disk, the friction processes that occur during the sliding contact.

According to an aspect the present invention, a tribometer comprises: an infrared (IR) transparent and optically transparent disk coupled to a platform, the disk having an observation side disk surface on an observation side of the disk and a contact side disk surface on a contact side of the disk; a motor coupled to the disk to rotate the disk, relative to the platform, around a rotational axis of the disk; a pivot support coupled to the platform; a pivoting member connected to the pivot support to pivot along a pivot plane which is perpendicular to the disk and which is parallel to and overlaps the rotational axis of the disk; a sample holder configured to hold a sample and be coupled with the pivoting member to be positioned on the contact side of the disk and to place the sample in contact with the contact side disk surface of the disk; and an IR camera and an optical microscope disposed on the observation side of the disk to observe the sample in sliding contact with the contact side disk surface of the disk driven in rotation by the motor.

In some embodiments, the tribometer further includes a force sensor coupled with the sample holder. The force sensor includes an XY load cell connected between the pivoting member and the sample holder to measure one or more real-time contact forces. A biasing member is coupled to the pivoting member to bias the sample holder toward the contact side disk surface of the disk. The sample holder is coupled with the pivoting member by a dovetailed slide connection.

In specific embodiments, the sample holder is positioned to place the sample in contact with the contact side disk surface at a radial distance from the rotational axis of the disk. The radial distance is adjustable by moving the sample holder relative to the disk.

In some embodiments, the tribometer further includes an adjustment mechanism to adjust the radial distance by moving the sample holder relative to the disk during rotation of the disk in sliding contact with the sample. A controller is coupled with the adjustment mechanism and the motor to control movement of the sample holder relative to the disk to adjust the radial distance based on a rotational speed of the disk driven in rotation by the motor.

In accordance with another aspect of the invention, a tribometer comprises: an infrared (IR) transparent and optically transparent disk coupled to a platform, the disk having an observation side disk surface on an observation side of the disk and a contact side disk surface on a contact side of the disk; a motor coupled to the disk to rotate the disk, relative to the platform, around a rotational axis of the disk; a mechanism for placing a sample in contact with the contact side disk surface of the disk; and an IR camera and an optical microscope disposed on the observation side of the disk to observe the sample in sliding contact with the contact side disk surface of the disk driven in rotation by the motor.

In some embodiments, the tribometer further includes a mechanism for measuring one or more contact forces at the sliding contact between the sample and the contact side disk surface of the rotating disk in sliding contact with the sample.

In specific embodiments, the tribometer further includes a mechanism for moving the sample relative to the disk to adjust the radial distance during rotation of the disk in sliding contact with the sample.

In accordance with yet another aspect of this invention, a tribometry method comprises: rotating, by a motor, an infrared (IR) transparent and optically transparent disk, around a rotational axis of the disk relative to a platform, the disk having an observation side disk surface on an observation side of the disk and a contact side disk surface on a contact side of the disk; placing a sample in contact with the contact side disk surface of the disk; and observing, by an IR camera and an optical microscope disposed on the observation side of the disk, the sample in sliding contact with the contact side disk surface of the disk driven in rotation by the motor.

In some embodiments, the tribometry method further includes: coupling a pivot support to the platform; connecting a pivoting member to the pivot support to pivot along a pivot plane which is perpendicular to the disk and which is parallel to and overlaps the rotational axis of the disk; and holding a sample by a sample holder and coupling the sample holder with the pivoting member to be positioned on the contact side of the disk and to place the sample in contact with the contact side disk surface of the disk.

In specific embodiments, the tribometry method further includes connecting a force sensor between the pivoting member and the sample holder to measure one or more contact forces at the sliding contact between the sample and the rotating disk in sliding contact with the sample. A biasing member is coupled to the pivoting member to bias the sample holder toward the contact side disk surface of the disk.

In some embodiments, the tribometry method further includes measuring, by a force sensor, one or more contact forces (normal force and tangential force) at the sliding contact between the sample and the rotating disk in sliding contact with the sample.

In specific embodiments, the tribometry method further includes placing the sample in contact with the contact side disk surface of the disk at a radial distance from the rotational axis of the disk; and adjusting the radial distance of the contact between the sample and the contact side disk surface of the disk. The radial distance is adjusted during rotation of the disk in sliding contact with the sample.

In some embodiments, the tribometry method further includes removing the sample holder, which is coupled with the pivoting member by a dovetailed slide connection, by sliding the sample holder off the dovetailed slide connection, and sliding the sample holder onto an imaging tool, via a dovetailed slide connection between the sample holder and the imaging tool, for post-test imaging and analysis of the sample.

Embodiments of the tribometer enable real-time observations at high spatial and temporal resolutions of the physical processes that occur during sliding contact between materials. These observations include the evolving micro-scale contact-temperature and contact-area distributions, the temperatures and shapes of any wear particles generated by the sliding contact, and the existence and fate of sample material melted by the frictional heat generated at the contact. These advantages are critical for studying materials whose properties change as they warm up in response to frictional heating at the contact. Existing devices do not permit real-time, high-resolution observations of the physical processes occurring at the sliding interface and rely mainly on post-test imaging to infer the nature of those processes. For temperature-sensitive sample materials, post-test analyses cannot unambiguously identify the physical processes that occurred at the sliding contact during the test.

Many physical processes can affect the sliding-friction behavior of materials. It is difficult or impossible to identify the dominant mechanisms using only post-test analysis techniques. Embodiments of the tribometer are designed to reveal those processes through real-time observations of the evolving contact region. The thermal response of the sample material can be especially important, and the tribometer enables the recording of real-time, high-resolution thermal maps of the contact during the test itself. Also, the tribometer permits observations of the shapes, sizes, numbers, and fate of wear particles (material abraded from the interface), characteristics of the friction process that are also essential to understand the underlying mechanisms. In addition, the tribometer's accessible and easy-to-remove sample holder enables rapid post-test imaging and analysis of the sample using external, state-of-art diagnostic tools such as scanning electron microscopes and micro-computed tomography. For sample materials with temperature-dependent material properties, rapid post-test transfer to external imaging tools is essential to preserve characteristics of the friction mechanisms.

Embodiments of the tribometer can be used for all fundamental investigations into the physical mechanisms underlying sliding friction. This includes studies to assess the nature of abrasion at the contact, the role of the resulting wear particles at the interface, and the fate of the wear particles within the broader mechanical system. In addition, the tribometer is well suited to study materials with temperature-dependent mechanical and chemical properties because it enables concurrent micro-scale temperature and optical observations of the interface while simultaneously measuring the frictional forces. An important class of studies are systems with materials operating close to their melting points, where abrasion resistance and material behavior are strongly dependent on temperature and where melting or chemical change can occur, all of which can fundamentally change the mechanisms underlying friction.

In sum, some of the novel features of the tribometer include: the ability to conduct concurrent, real-time, continuous, high-resolution observations of the contact interface during sliding-friction studies; concurrent contact-force measurements and contact imaging throughout a friction test; rapid post-test removal of the sample for study using external diagnostic or imaging tools; compact design to facilitate tests in an environmental chamber to control ambient temperature, humidity, pressure, and other environmental conditions; and simple drive and control of slider speed, arranged below the rotating window to facilitate imaging of the contact interface.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments of the present invention provide a tribometer for testing a sliding contact between a sample of a material of interest (e.g., ice or snow) and an IR transparent and optically transparent rotating slider. An IR camera and/or an optical microscope are used to observe, through the IR and optically transparent rotating slider, the friction processes that occur during the sliding contact. A force sensor is used to perform concurrent contact-force measurements at the sliding contact.

Figure 1:
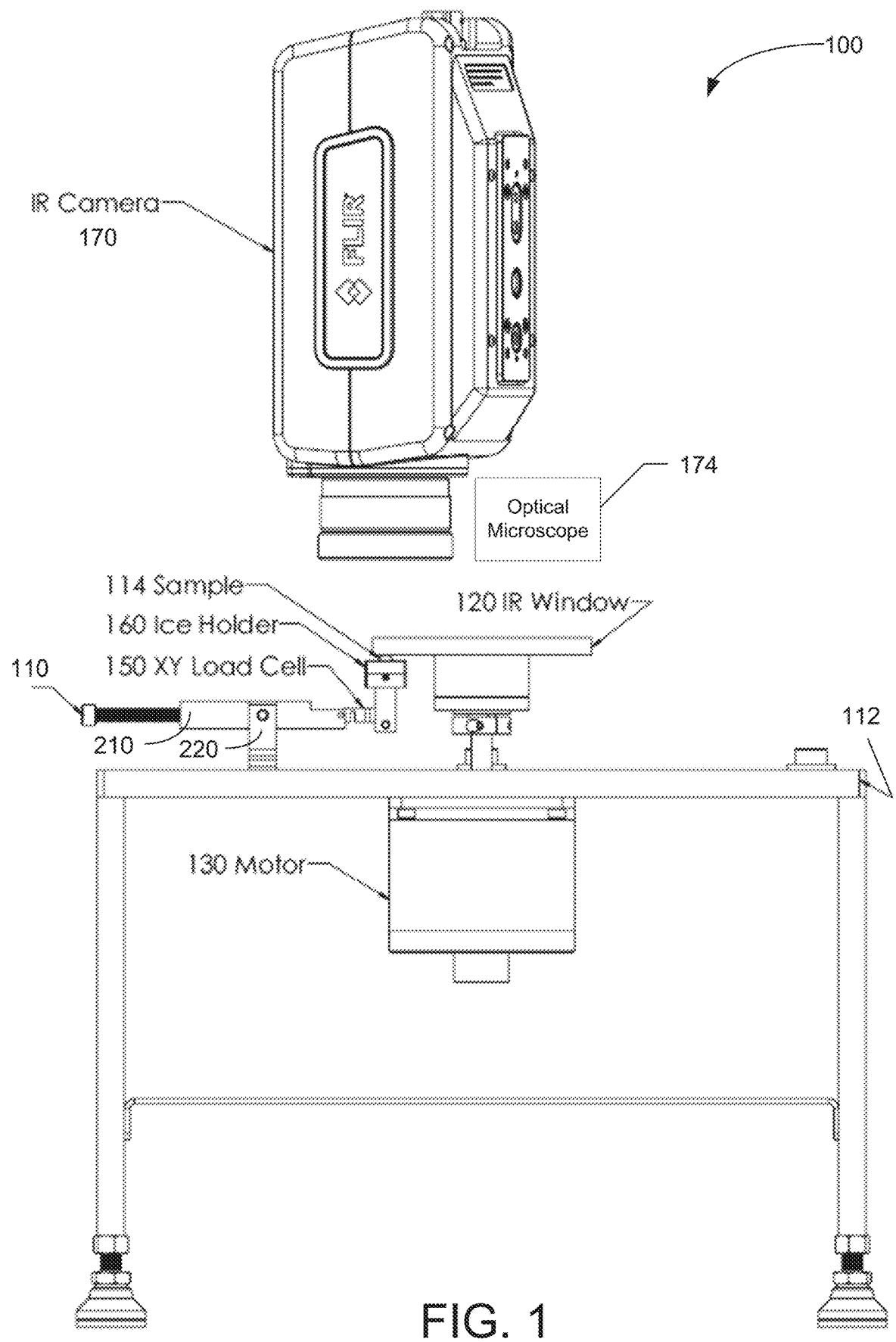
FIG. 1 illustrates a front elevational view of a tribometer according to an embodiment of the present invention.
Figure 2:
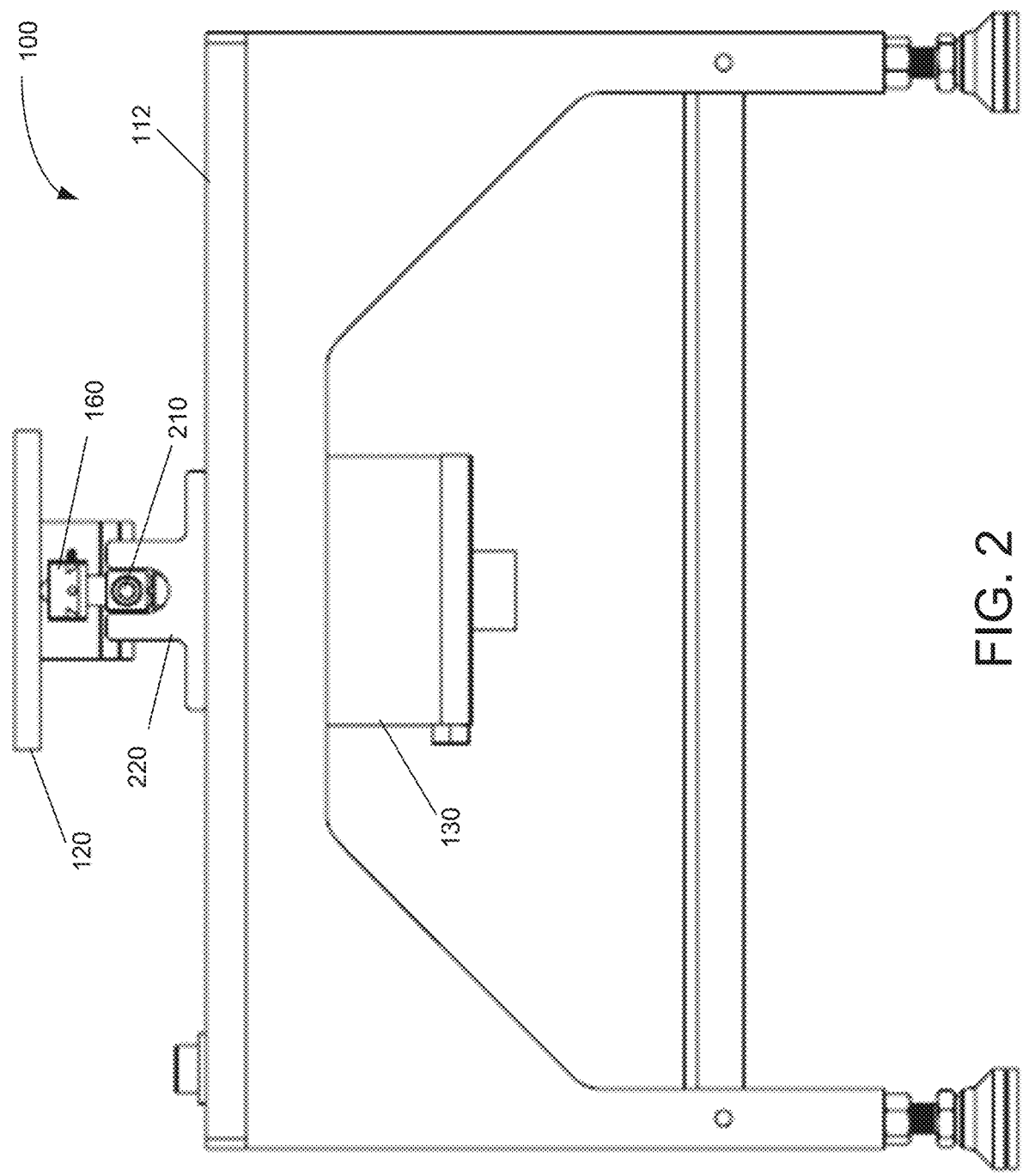
FIG. 2 illustrates a left side elevational view of a portion of the tribometer of FIG. 1 omitting the observation components.
Figure 3:
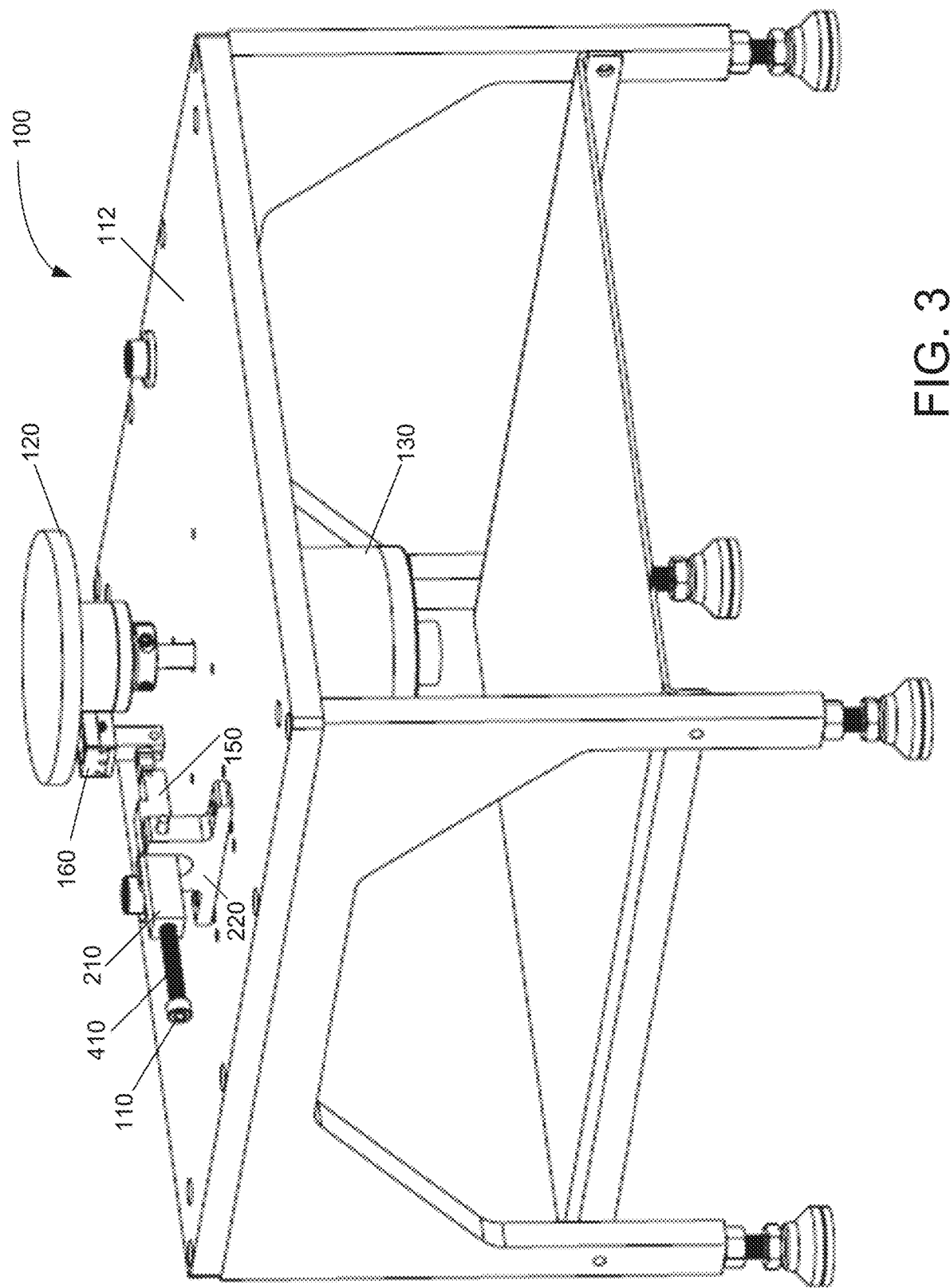
FIG. 3 illustrates a perspective view of the portion of the tribometer of FIG. 2.

FIG. 1 illustrates a front elevational view of a tribometer according to an embodiment of the present invention. FIG. 2 illustrates a left side elevational view of a portion of the tribometer of FIG. 1 omitting the observation components (e.g., IR camera and optical microscope). FIG. 3 illustrates a perspective view of the portion of the tribometer of FIG. 2.

The tribometer 100 includes a slider in the form of a disk or window 120 that is typically circular and rotated by a motor 130 relative to a table or platform 112, around a rotational axis of the disk 120. They are conveniently coupled or mounted to the table or platform 112 via a rotating shaft or spindle along the rotational axis (vertical in FIG. 1). The disk 120 is disposed above and the motor 130 is disposed below the table 112. The disk 120 is IR transparent and optically transparent. It may be made of glass or a transparent polymer such as polyethylene. The surfaces of the disk 120 are typically smooth but they may be textured to a certain extent as long as the disk 120 remains IR transparent and optically transparent. The disk 120 has an observation side disk surface on an observation side of the disk (top surface of disk 120 in FIG. 1) and a contact side disk surface on a contact side of the disk (bottom surface of disk 120 in FIG. 1). The disk 120 is disposed horizontally in FIG. 1. In other embodiments, the disk 120 may be disposed at an angle or even vertically.

A sample or specimen 114 is disposed on a sample or specimen holder 160 on the contact side of the disk 120 to contact the contact side disk surface. A pivoting member 210 pivots on a pivot support 220. The pivoting member 210 is coupled via a force sensor 150 to the sample holder 160 on one side and coupled to a counterweight 110 on the other side. An IR camera 170 and an optical microscope 174 are disposed on the observation side of the disk 120 (above the disk 120 in FIG. 1) to observe the sample 114 in sliding contact with the contact side disk surface on the contact side of the disk 120 (below the disk 120 in FIG. 1) driven in rotation by the motor 130 during the friction test.

Figure 4:
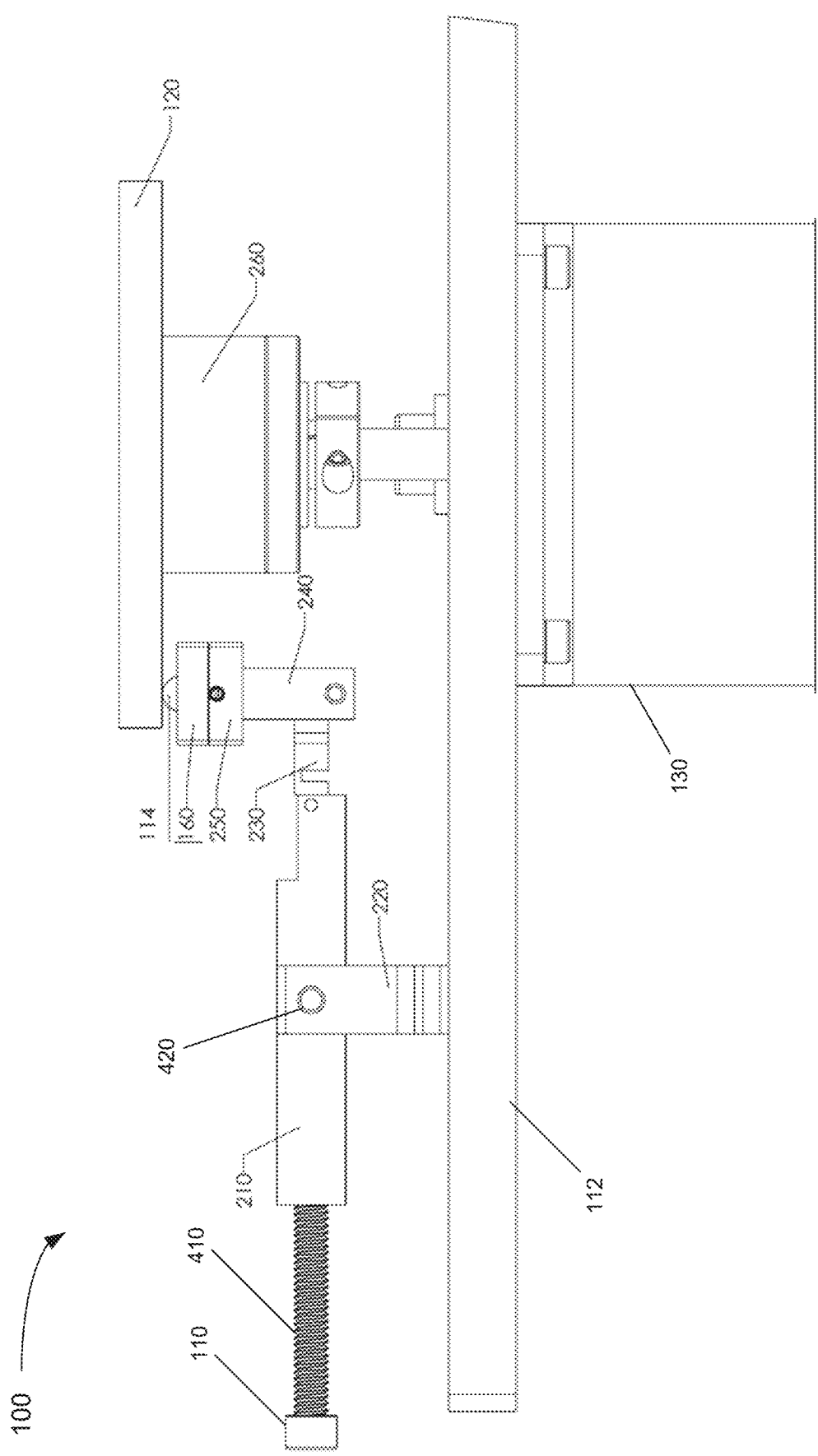
FIG. 4 illustrates a closeup front elevational view of the portion of the tribometer of FIG. 2.
Figure 5:
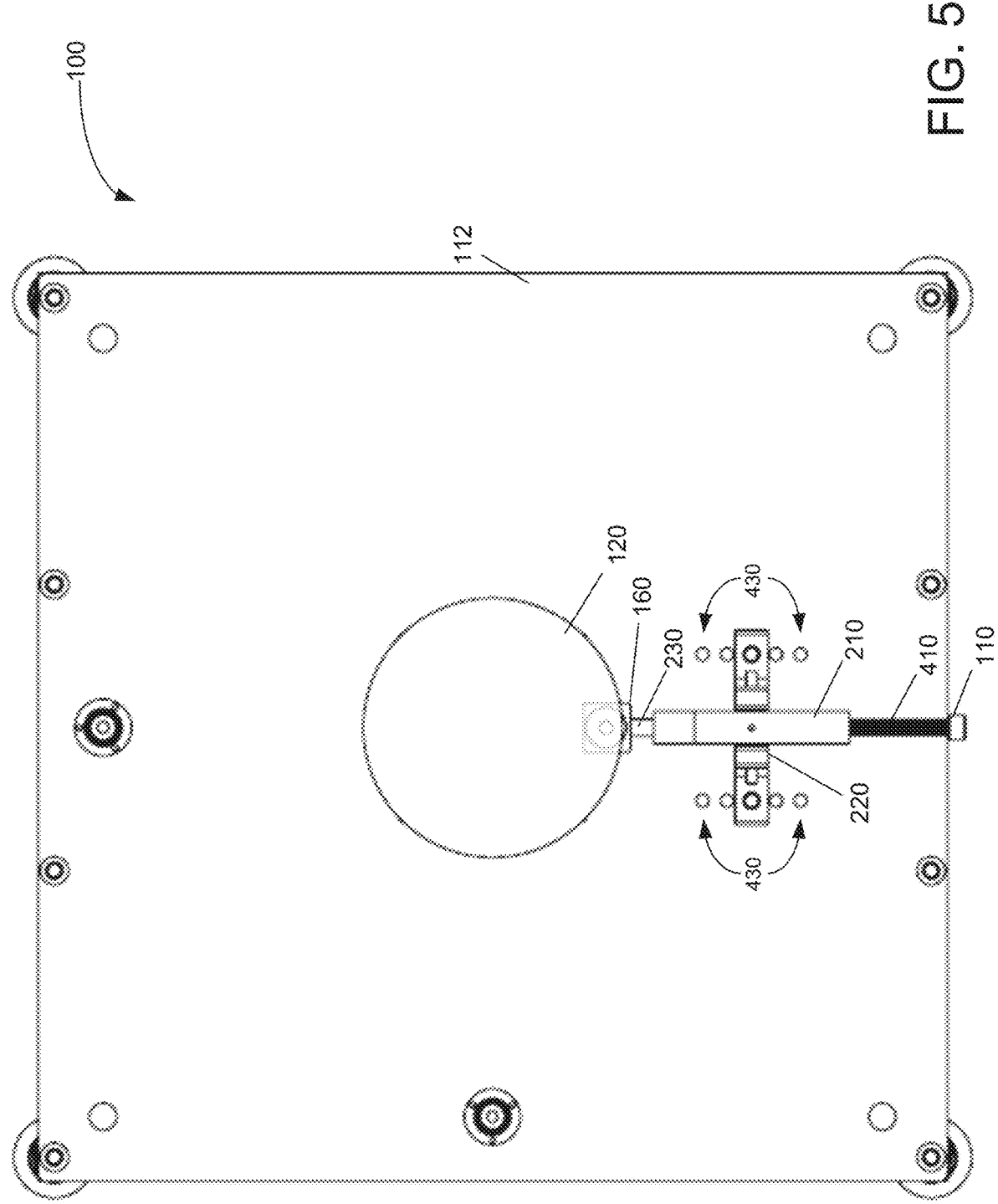
FIG. 5 illustrates a top plan view of the portion of the tribometer of FIG. 2.
Figure 6:
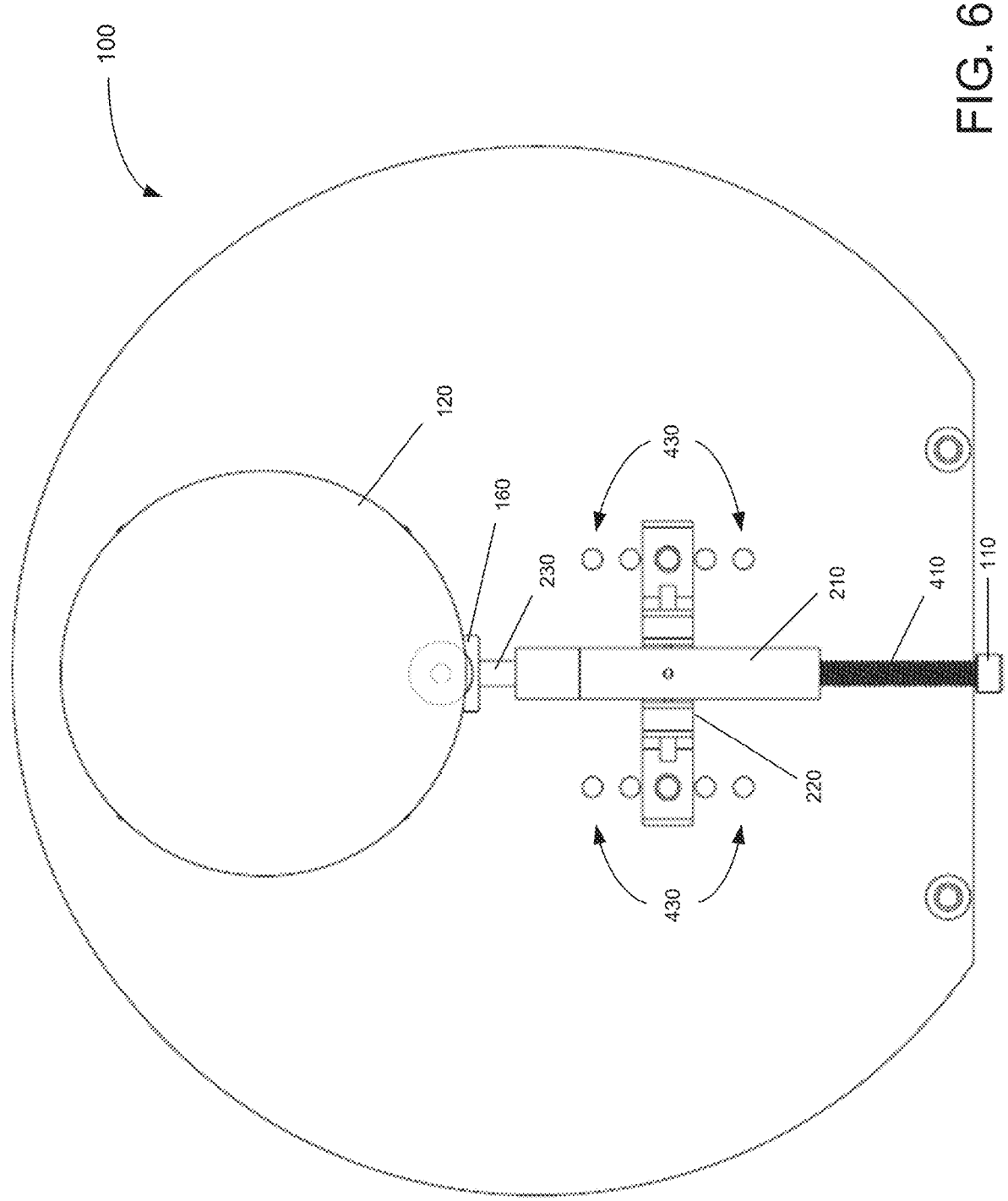
FIG. 6 illustrates a closeup top plan view of the portion of the tribometer of FIG. 2.

FIG. 4 illustrates a closeup front elevational view of the portion of the tribometer 100 of FIG. 2. FIG. 5 illustrates a top plan view of the portion of the tribometer of FIG. 2. FIG. 6 illustrates a closeup top plan view of the portion of the tribometer of FIG. 2.

The pivot support 220 is disposed on or otherwise coupled to the table 112 to support the pivoting member or beam 210. The pivoting member 210 pivots along a pivot plane that is perpendicular to the disk 120 and that is parallel to and overlaps the rotational axis of the disk 120. A sample holder support (lower support member 240 and upper support member 250) is attached or coupled to one side of the pivoting beam 210, via the force sensor 230 (150 in FIG. 1) for supporting the sample holder 160 which holds the sample 114. The sample holder 160 is positioned on the contact side of the disk 120 and to place the sample 114 in contact with the contact side disk surface of the disk 120. The sample holder 160 is positioned to place the sample 114 in contact with the contact side disk surface at a radial distance from the rotational axis of the disk 120.

A biasing member in the form of the counterweight 110 is disposed on or coupled to the other side of the pivoting beam 210 to push or bias the sample 114 and sample holder 160 toward the contact side disk surface of the disk 120 (lower surface in FIG. 4) to make sliding contact as the disk 120 is rotated by the motor 130. In this embodiment, the counterweight 110 is connected to the pivoting beam 210 by a threaded member 410 such as a bolt to allow the distance between the counterweight 110 and the pivot 420 to be changed, thereby adjusting the rotational moment of the counterweight 110 exerted along the pivot plane and hence the normal force applied to the contact between the sample 114 and the contact side disk surface of the rotating disk 120. Of course, additional counterweight can be attached instead of or in addition to adjusting the distance of the counterweight 110 from the pivot 420.

In another embodiment, the biasing member takes the form of a spring or force actuator, rather than a pivoting beam and counterweight, to apply a normal force between the sample 114 and the contact side disk surface of the rotating disk 120. The spring or force actuator may either pull down on the far end of pivoting beam 210 where the counterweight 410 would otherwise be located or push up on the near end of pivoting beam 210 at a location between the pivot 420 and the XY load cell 230.

The force sensor 230 (150 in FIG. 1) is coupled to the sample 114 via the sample holder 160 for measuring contact force(s) at the sliding contact between the sample 114 and the contact side disk surface of the rotating disk 120 in sliding contact with the sample 114. In the embodiment shown, the force sensor in the form of an XY load cell 230 is connected between the pivoting beam 210 and the sample holder 160 via the sample holder support (240, 250). The disk 120 is placed on a disk support 260 which is connected via a spindle or shaft to the motor 130 that drives the disk 120 via the disk support 260 in rotation.

Figure 7:
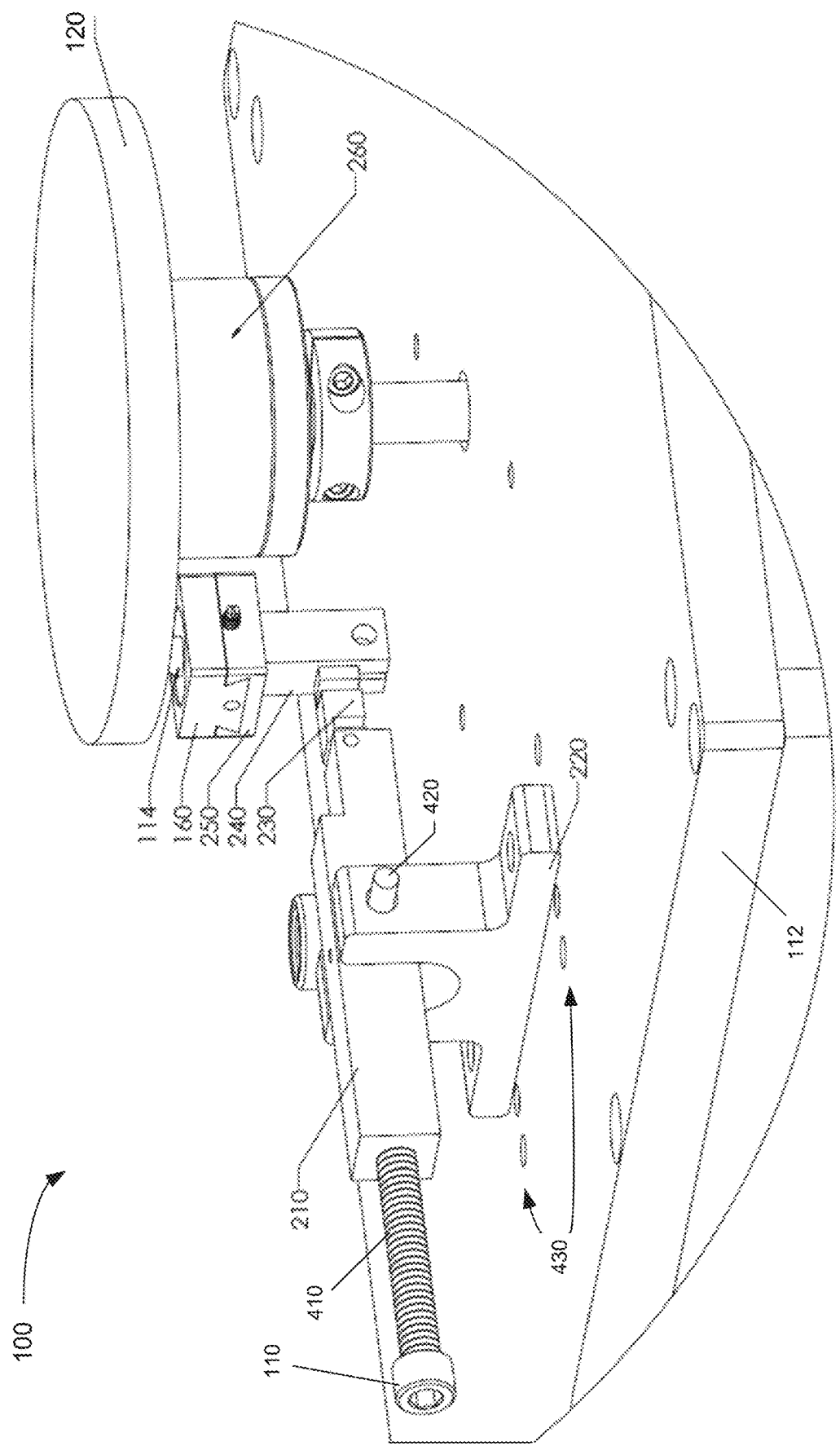
FIG. 7 illustrates a closeup perspective view of the portion of the tribometer of FIG. 2.
Figure 8:
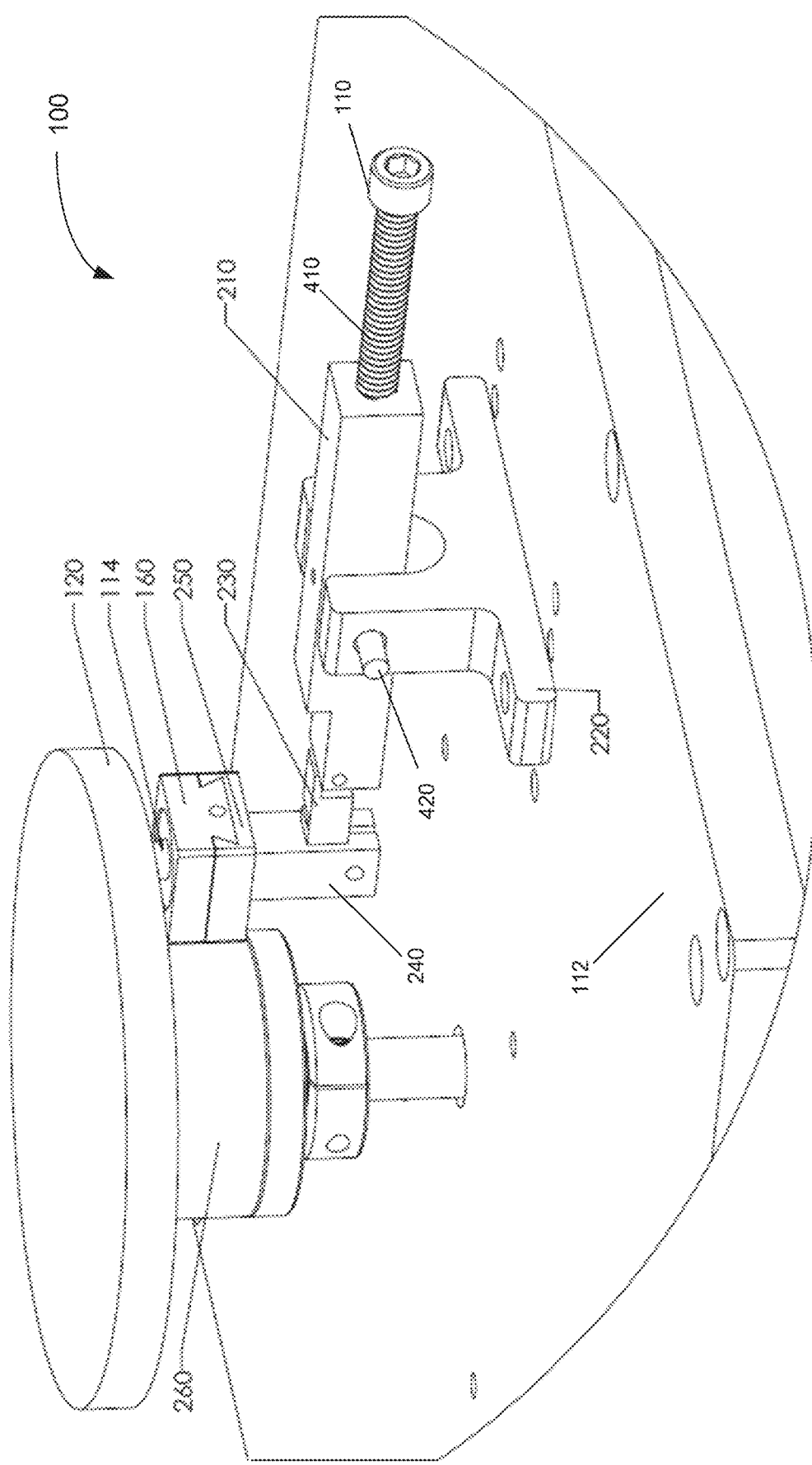
FIG. 8 illustrates another closeup perspective view of the portion of the tribometer of FIG. 2.
Figure 9:
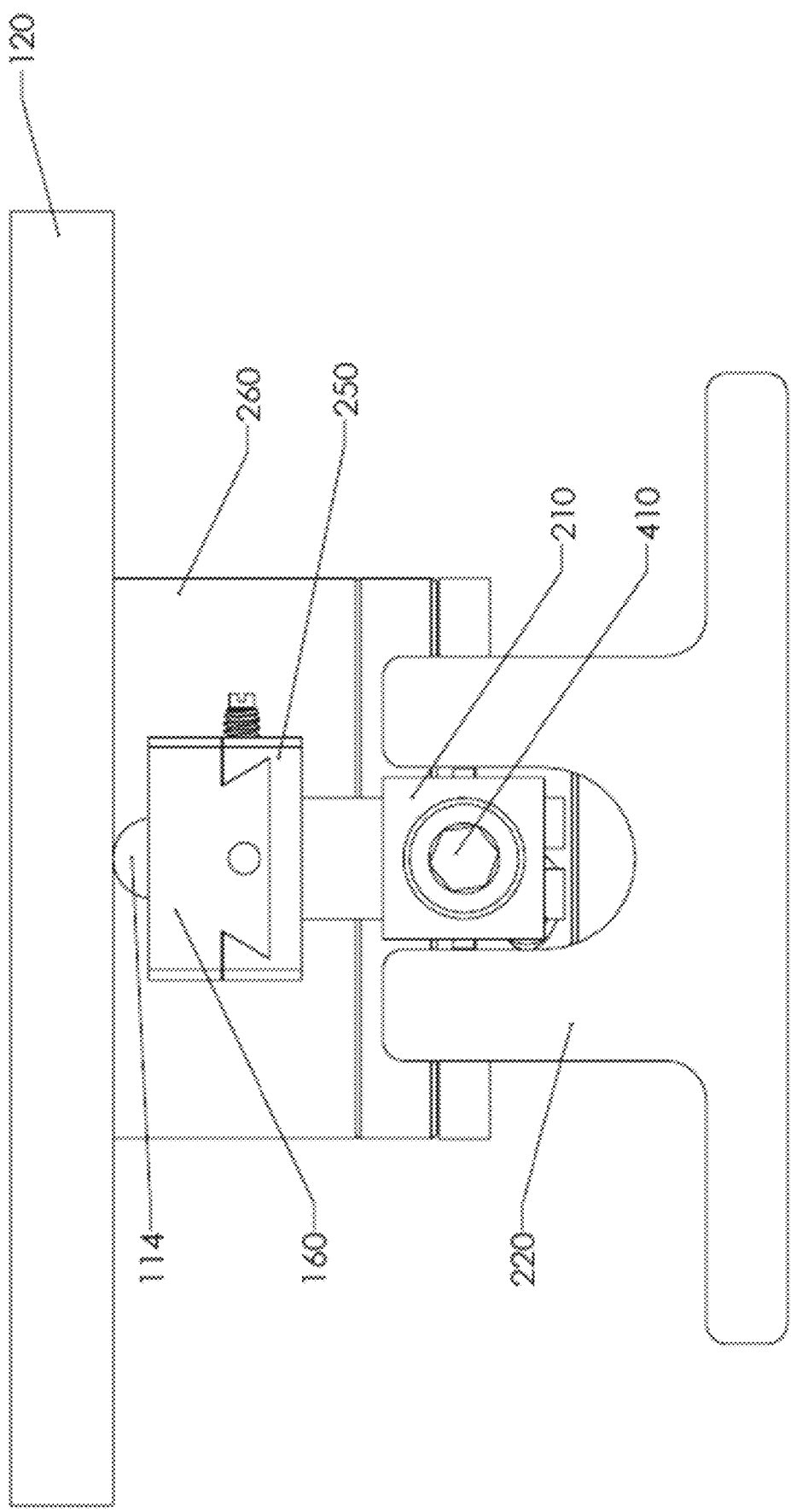
FIG. 9 illustrates a closeup left side elevational view of the portion of the tribometer of FIG. 2 further omitting the table and components below the table.

FIG. 7 illustrates a closeup perspective view of the portion of the tribometer 100 of FIG. 2. FIG. 8 illustrates another closeup perspective view of the portion of the tribometer of FIG. 2. FIG. 9 illustrates a closeup left side elevational view of the portion of the tribometer of FIG. 2 further omitting the table and components below the table.

The sample holder 160 is connected to the upper member 250 of the sample holder support by a dovetailed or beveled slide connection, which allows the sample holder 160 to be removed quickly by sliding the sample holder 160 off the dovetailed slide connection, which can be quickly loaded onto an external diagnostic or imaging tool via the dovetailed slide connection for rapid post-test imaging and analysis of the sample after the friction test is completed on the tribometer 100.

As best seen in FIGS. 5-7, the sample holder 160 is positioned to place the sample 114 in contact with the contact side disk surface at a radial distance from the rotational axis of the disk 120. The radial distance can be adjusted, for instance, by adjusting the radial position of the pivot support 220 with respect to the rotational axis of the disk 120. There are a series of radially spaced attachment locations 430 (e.g., threaded openings for receiving threaded bolts) on the table 112 for attaching the pivot support 220. The change in attachment locations to change the radial distance can be done manually.

Figure 10:
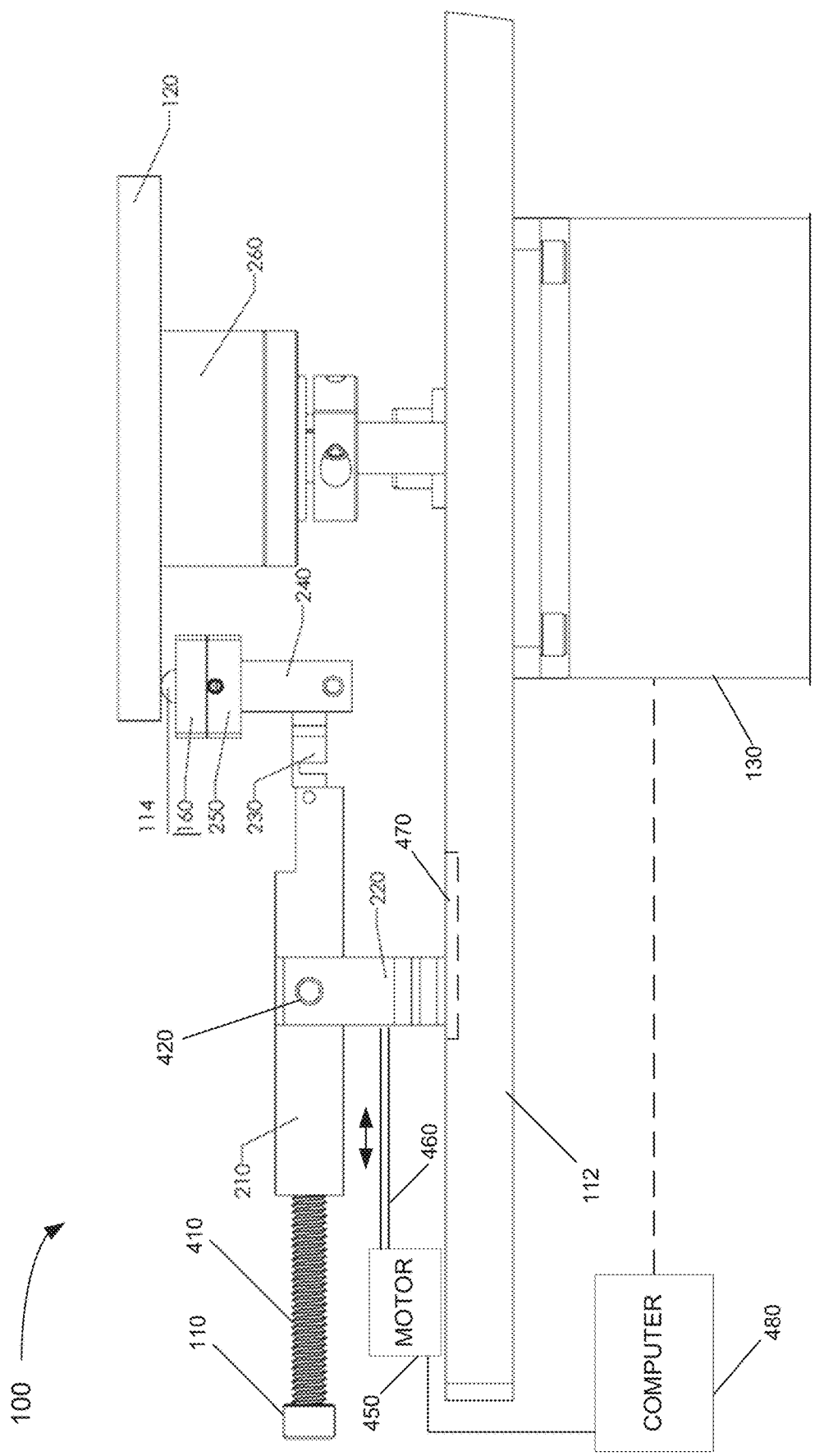
FIG. 10 illustrates a closeup front elevational view of a portion of the tribometer of FIG. 2 showing a dynamic sample holder adjustment mechanism according to another embodiment of the invention.

FIG. 10 illustrates a closeup front elevational view of a portion of the tribometer of FIG. 2 showing a dynamic sample holder adjustment mechanism according to another embodiment of the invention. The dynamic sample holder adjustment mechanism of this tribometer 440 allows the sample holder 160 to be moved dynamically relative to the rotational axis of the rotating disk 120 to adjust the radial distance of the contact between the sample 114 and the contact side disk surface of the disk 120, before the friction test and/or during the friction test while the sample 114 is in sliding contact with the rotating disk 120 that is driven in rotation by the motor 130. In this specific embodiment, a motor 450 drives a drive shaft or link 460 in linear motion to move the pivot support 220 in the radial direction toward or away from the rotational axis of the disk 120. A linear guide path or slot 470 is provided on the table 112 to guide the movement of the pivot support 220.

One way to coordinate the radial movement of the sample holder 160 and the rotational movement of the rotating disk 120 is by measuring the rotation of the disk 120 (e.g., using a tachometer) and using the measurement as feedback to control radial movement of the sample. The feedback control can be achieved mechanically using a mechanical feedback mechanism or electronically using electrical control with a computer 480. The computer 480 serves as a controller, coupled with the motor 130 and the adjustment mechanism (e.g., the drive shaft 460 coupled to the pivot support 220 movable along the linear guide path 470), to control movement of the sample holder 160 relative to the disk 120 to adjust the radial distance based on a rotational speed of the disk 120 driven in rotation by the motor 130. Alternatively, the computer 480 may be coupled with both the linear motor 450 and the rotational motor 130 to control the linear movement of the sample holder 160 and the rotation of the disk 120.

FIGS. 1-10 each show a single-contact tribometer 100, 440, in which the pivoting counterweight 110 presses a single material sample 114 against the rotating IR transparent and optically transparent disk 120. The motor 130 spins the disk 120 over a range of speeds. The layout allows the IR-sensitive camera 170 to view the contact region through the disk 120 and record the evolving contact-temperature and contact-area distributions at fine spatial and temporal resolution. The adjacent optical microscope 174 can simultaneously observe the contact processes in optical light. The force sensor such as a precision XY load cell 230 provides two-directional contact-force measurements (normal and tangential forces) to calculate the friction coefficient. The tribometer 100, 440 provides simple methods to vary test conditions such as slider speed and normal load. The sample holder 160 can be removed quickly for rapid post-test imaging and analysis of the sample. The compact design facilitates its use in an environmental chamber to control ambient temperature, humidity, pressure, and other environmental conditions. The combination of these features makes the invention much easier to use and more versatile than existing tribometers.

Figure 11:
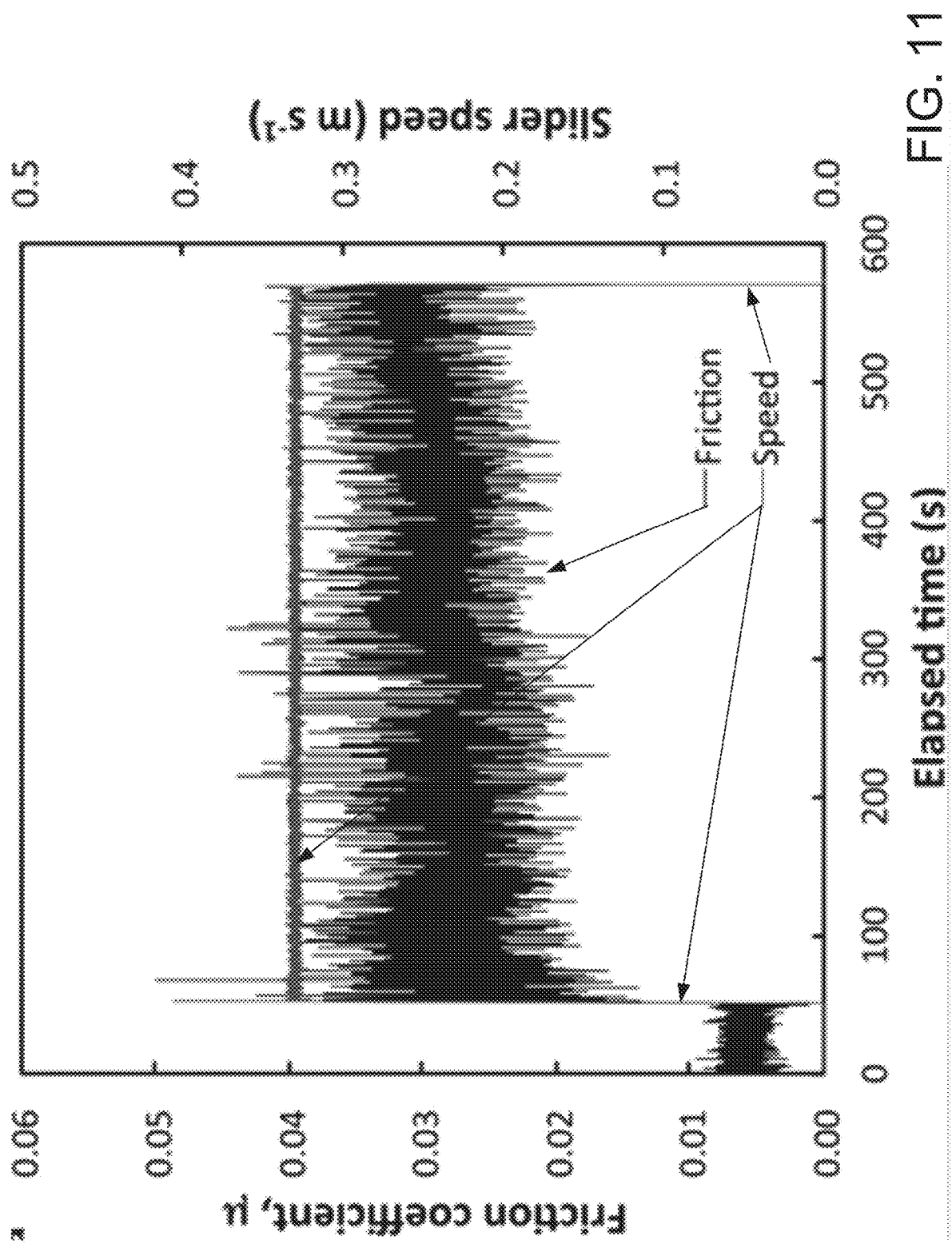
FIG. 11 is an example of a graph showing results of friction coefficient and slider speed as functions of elapsed time.

FIG. 11 is an example of a graph showing results of friction coefficient and slider speed as functions of elapsed time. The instantaneous or real-time friction coefficients can be calculated from measured forces by the force sensor 230.

Figure 12:
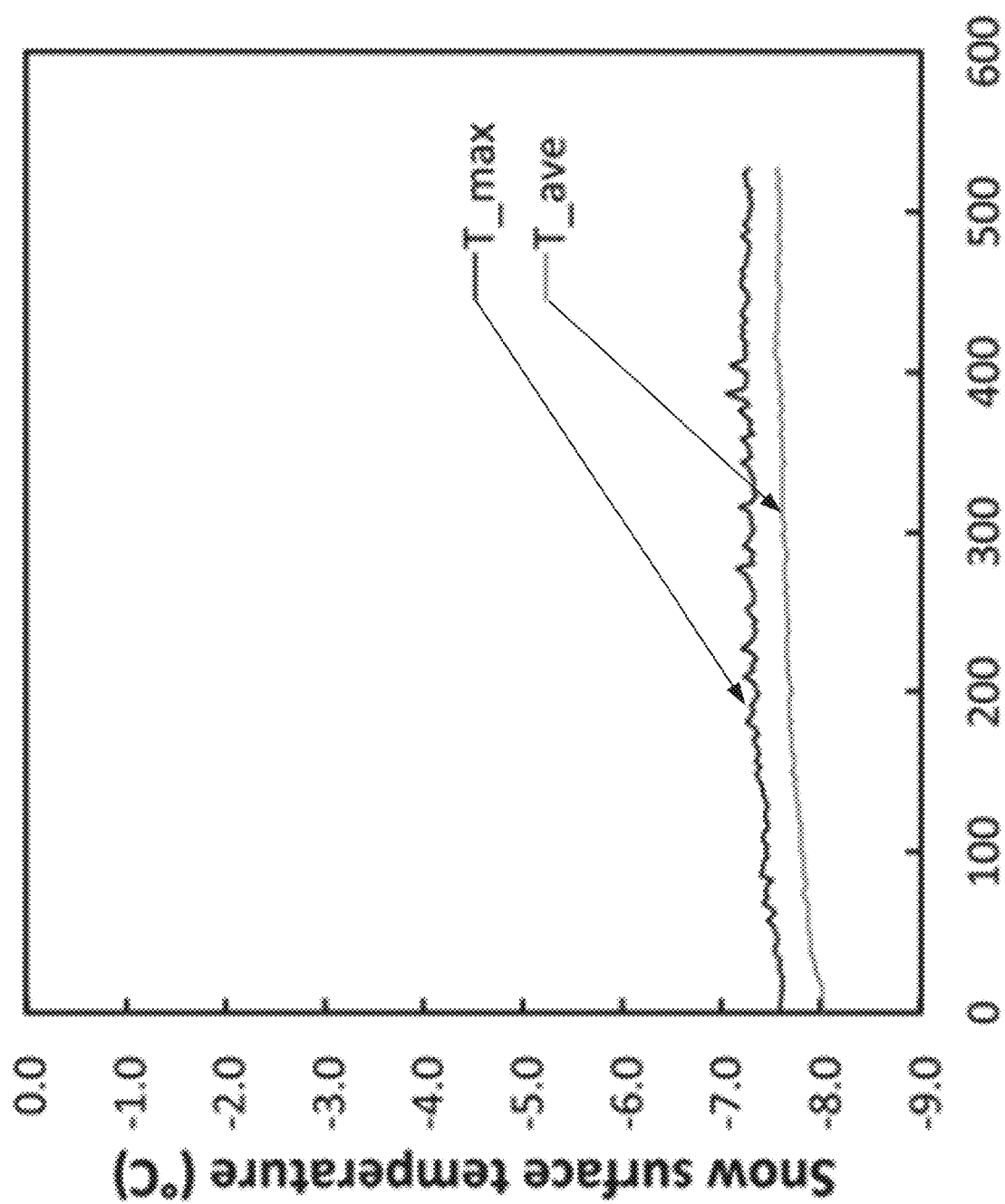
FIG. 12 is an example of a graph showing results of IR-based maximum and average snow sample surface temperatures as functions of elapsed time.

FIG. 12 is an example of a graph showing results of IR-based maximum and average snow sample surface temperatures as functions of elapsed time. The instantaneous or real-time surface temperatures can be captured by the IR camera 170.

Figure 13:
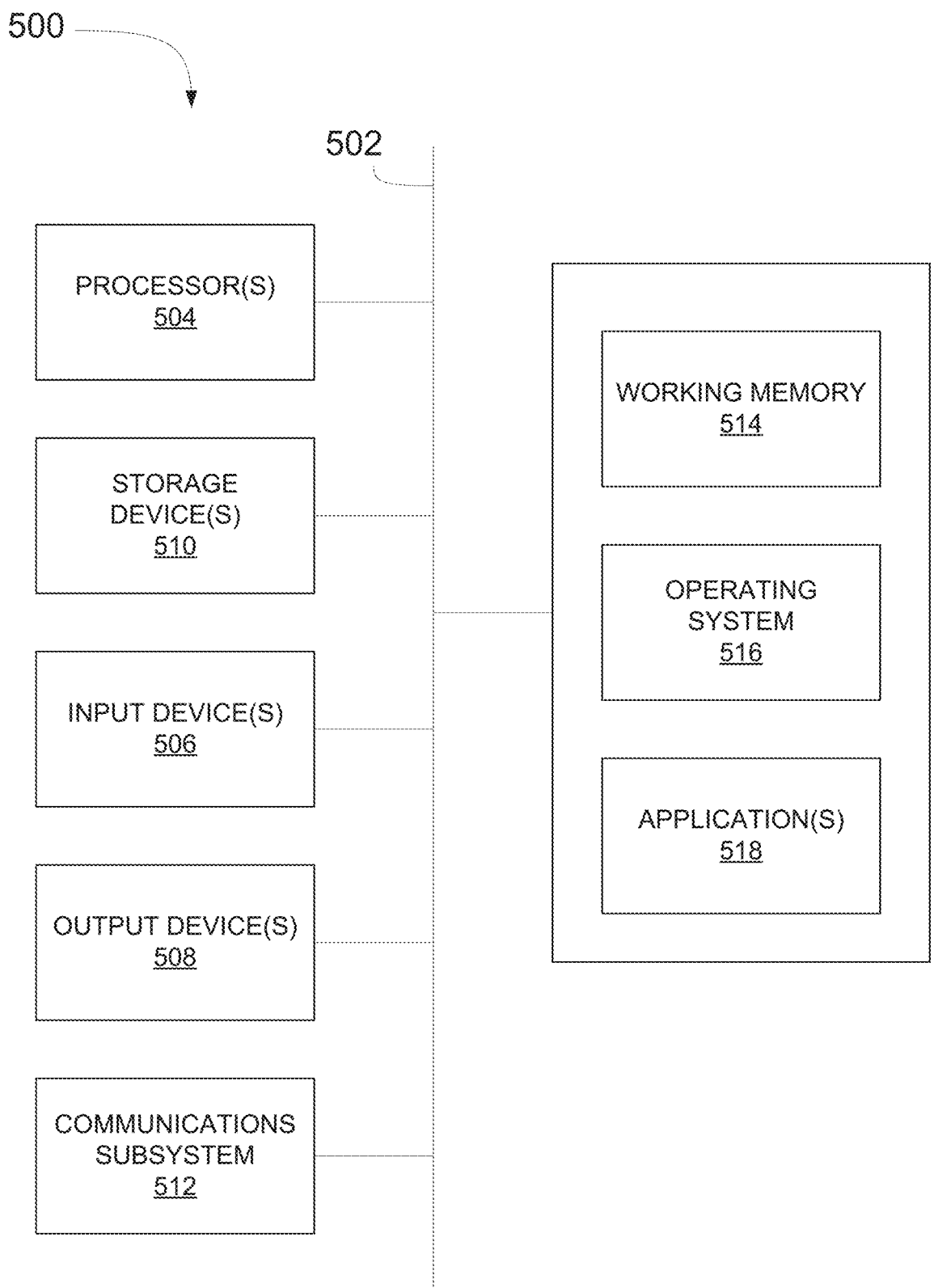
FIG. 13 depicts an exemplary computer system or device configured for use with the tribometer according to an embodiment of the present invention.

FIG. 13 depicts an exemplary computer system or device configured for use with the tribometer according to an embodiment of the present invention. This computer 500 may be used as the computer 480 shown in FIG. 10. An example of a computer system or device 500 may include an enterprise server, blade server, desktop computer, laptop computer, tablet computer, personal data assistant, smartphone, any combination thereof, and/or any other type of machine configured for performing calculations. Any computing devices encompassed by embodiments of the present invention may be wholly or at least partially configured to exhibit features similar to the computer system 500.

The computer device 500 of FIG. 13 is shown comprising hardware elements that may be electrically coupled via a bus 502 (or may otherwise be in communication, as appropriate). The hardware elements may include a processing unit with one or more processors 504, including without limitation one or more general-purpose processors and/or one or more special-purpose processors (such as digital signal processing chips, graphics acceleration processors, and/or the like); one or more input devices 506, which may include without limitation a remote control, a mouse, a keyboard, and/or the like; and one or more output devices 508, which may include without limitation a presentation device (e.g., controller screen), a printer, and/or the like. Input to the computer system 500 may be provided by analog-to-digital converters to convert the measurement signals from the XY load cell 230, the IR camera 170, optical camera 174, and any other measurement devices into digital form for storage and/or processing. Separate external analog-to-digital devices can be attached to the bus 502 or communication subsystem 512 to provide measurements in digital form to the computer system 500. In some cases, an output device 508 may include, for example, a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from computer system 500 to a user. Output from the computer system 500 may be provided to digital-to-analog converters to send control signals from the computer to the motors 130 and 450 and any other actuators used in other embodiments. Digitally controlled motors or actuators may be attached to the bus 502 or communication subsystem 512 for digital control by the computer The computer system 500 may further include (and/or be in communication with) one or more non-transitory storage devices 510, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 500 can also include a communications subsystem 512, which may include without limitation a modem, a network card (wireless and/or wired), an infrared communication device, a wireless communication device and/or a chipset such as a Bluetooth device, 802.11 device, Wi-Fi device, WiMAX device, cellular communication facilities such as GSM (Global System for Mobile Communications), W-CDMA (Wideband Code Division Multiple Access), LTE (Long Term Evolution), and the like. The communications subsystem 512 may permit data to be exchanged with a network (such as the network described below, to name one example), other computer systems, controllers, and/or any other devices described herein. In many embodiments, the computer system 500 can further comprise a working memory 514, which may include a random access memory and/or a read-only memory device, as described above.

The computer device 500 also can comprise software elements, shown as being currently located within the working memory 514, including an operating system 516, device drivers, executable libraries, and/or other code, such as one or more application programs 518, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 510 described above. In some cases, the storage medium might be incorporated within a computer system, such as computer system 500. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 500 and/or might take the form of source and/or installable code, which, upon compilation and/or installation on the computer system 500 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 500) to perform methods in accordance with various embodiments of the disclosure. According to a set of embodiments, some or all of the procedures of such methods are performed by the computer system 500 in response to processor 504 executing one or more sequences of one or more instructions (which might be incorporated into the operating system 516 and/or other code, such as an application program 518) contained in the working memory 514. Such instructions may be read into the working memory 514 from another computer-readable medium, such as one or more of the storage device(s) 510. Merely by way of example, execution of the sequences of instructions contained in the working memory 514 may cause the processor(s) 504 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 500, various computer-readable media might be involved in providing instructions/code to processor(s) 504 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 510. Volatile media may include, without limitation, dynamic memory, such as the working memory 514.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 504 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 512 (and/or components thereof) generally can receive signals, and the bus 502 then can carry the signals (and/or the data, instructions, and the like, carried by the signals) to the working memory 514, from which the processor(s) 504 retrieves and executes the instructions. The instructions received by the working memory 514 may optionally be stored on a non-transitory storage device 510 either before or after execution by the processor(s) 504.

It should further be understood that the components of computer device 500 can be distributed across a network. For example, some processing may be performed in one location using a first processor while other processing may be performed by another processor remote from the first processor. Other components of computer system 500 may be similarly distributed. As such, computer device 500 may be interpreted as a distributed computing system that performs processing in multiple locations. In some instances, computer system 500 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512-bit, 256-bit, 128-bit, 64-bit, 32-bit, or 16-bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

As will be appreciated by one of ordinary skill in the art, the present invention may be embodied as an apparatus (including, for example, a system, a machine, a device, and/or the like), as a method (including, for example, a business process, and/or the like), as a computer-readable storage medium, or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A tribometer comprising:
   an infrared (IR) transparent and optically transparent disk coupled to a platform, the disk having an observation side disk surface on an observation side of the disk and a contact side disk surface on a contact side of the disk;
   a motor coupled to the disk to rotate the disk, relative to the platform, around a rotational axis of the disk;
   a pivot support coupled to the platform;
   a pivoting member connected to the pivot support to pivot along a pivot plane which is perpendicular to the disk and which is parallel to and overlaps the rotational axis of the disk;
   a sample holder configured to hold a sample of a material to be tested and being coupled with the pivoting member to be positioned on the contact side of the disk and to place the sample in contact with the contact side disk surface of the disk; the sample holder configured to hold the sample stationary relative to the pivoting member; and
   an IR camera and an optical microscope disposed on the observation side of the disk to observe the sample in sliding contact with the contact side disk surface of the disk driven in rotation by the motor.

2. The tribometer of claim 1, further comprising: a force sensor coupled with the sample holder.

3. The tribometer of claim 2, wherein the force sensor comprises an XY load cell connected between the pivoting member and the sample holder.

4. The tribometer of claim 1, further comprising: a biasing member coupled to the pivoting member to bias the sample holder toward the contact side disk surface of the disk.

5. The tribometer of claim 1, wherein the sample holder is positioned to place the sample in contact with the contact side disk surface at a radial distance from the rotational axis of the disk; and wherein the radial distance is adjustable by moving the sample holder relative to the disk.

6. The tribometer of claim 5, further comprising: an adjustment mechanism to adjust the radial distance by moving the sample holder relative to the disk during rotation of the disk in sliding contact with the sample.

7. The tribometer of claim 6, further comprising: a controller, coupled with the adjustment mechanism and the motor, to control movement of the sample holder relative to the disk to adjust the radial distance based on a rotational speed of the disk driven in rotation by the motor.

8. The tribometer of claim 1, wherein the sample holder is coupled with the pivoting member by a dovetailed slide connection.

9. A tribometer comprising:
   an infrared (IR) transparent and optically transparent disk coupled to a platform, the disk having an observation side disk surface on an observation side of the disk and a contact side disk surface on a contact side of the disk;
   a motor coupled to the disk to rotate the disk, relative to the platform, around a rotational axis of the disk;
   a pivot support coupled to the platform;
   a pivoting member connected to the pivot support;
   a sample holder configured to hold a sample of a material to be tested and configured to place the sample in contact with the contact side disk surface of the disk; the sample holder configured to hold the sample stationary relative to the pivoting member; and
   an IR camera and an optical microscope disposed on the observation side of the disk to observe the sample in sliding contact with the contact side disk surface of the disk driven in rotation by the motor.

10. The tribometer of claim 9, further comprising: means for measuring one or more contact forces at the sliding contact between the sample and the contact side disk surface of the rotating disk in sliding contact with the sample.

11. The tribometer of claim 9, wherein the sample is placed in contact with the contact side disk surface at a radial distance from the rotational axis of the disk; and wherein the radial distance is adjustable by moving the sample relative to the disk.

12. The tribometer of claim 11, further comprising: an adjustment mechanism configured to move the sample relative to the disk to adjust the radial distance during rotation of the disk in sliding contact with the sample.

13. A tribometry method comprising:
    rotating, by a motor, an infrared (IR) transparent and optically transparent disk, around a rotational axis of the disk relative to a platform, the disk having an observation side disk surface on an observation side of the disk and a contact side disk surface on a contact side of the disk;
    coupling a pivot support to the platform;
    connecting a pivoting member to the pivot support;
    holding a sample of a material to be tested by a sample holder and coupling the sample holder with the pivoting member to be positioned on the contact side of the disk and to place the sample in contact with the contact side disk surface of the disk; the sample holder configured to hold the sample stationary relative to pivoting member;
    placing the sample in contact with the contact side disk surface of the disk;
    and
    observing, by an IR camera and an optical microscope disposed on the observation side of the disk, the sample in sliding contact with the contact side disk surface of the disk driven in rotation by the motor.

14. The tribometry method of claim 13, further comprising: wherein the pivot member pivots along a pivot plane which is perpendicular to the disk and which is parallel to and overlaps the rotational axis of the disk.

15. The tribometry method of claim 14, further comprising: connecting a force sensor between the pivoting member and the sample holder to measure one or more contact forces at the sliding contact between the sample and the rotating disk in sliding contact with the sample.

16. The tribometry method of claim 15, further comprising: coupling a biasing member to the pivoting member to bias the sample holder toward the contact side disk surface of the disk.

17. The tribometry method of claim 13, further comprising: measuring, by a force sensor, one or more contact forces at the sliding contact between the sample and the rotating disk in sliding contact with the sample.

18. The tribometry method of claim 13, further comprising: placing the sample in contact with the contact side disk surface of the disk at a radial distance from the rotational axis of the disk; and adjusting the radial distance of the contact between the sample and the contact side disk surface of the disk.

19. The tribometry method of claim 18, wherein the radial distance is adjusted during rotation of the disk in sliding contact with the sample.

20. The tribometry method of claim 13, further comprising: removing the sample holder, which is coupled with the pivoting member by a dovetailed slide connection, by sliding the sample holder off the dovetailed slide connection, and sliding the sample holder onto an imaging tool, via a dovetailed slide connection between the sample holder and the imaging tool, for post-test imaging and analysis of the sample.

* * * * *